Patented Aug. 29, 1933

1,924,567

UNITED STATES PATENT OFFICE 1,924,567

VULCANIZATION ACCELERATOR

Ludwig Orthner, Leverkusen-I. G. Werk, and Max Bögemann, Cologne-Mulheim, Germany, assignors to I. G. Farbenindustrie Aktiengesellschaft, Frankfort-on-the-Main, Germany No Drawing. Application September 16, 1932, Serial No. 633,455, and in Germany September 19, 1931

15 Claims. (Cl. 18—53)

The present invention relates to new vulcanization accelerators, to a process of vulcanizing rubber and to the vulcanization products obtainable by said process:
Compounds containing the grouping

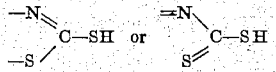

or the salts thereof, such as mercaptoarylene thiazoles or dithiocarbamates are known to be valuable vulcanization accelerators. They have, however, the disadvantage of a rather low critical temperature.

It is the main object of our invention to provide vulcanization accelerators of the above classes possessing a substantially better critical temperature.

The accelerators we have found to possess the desired property are those obtainable by esterifying the sulfhydryl group of compounds containing the above mentioned groupings by an aryl radical containing a nitro group and, in meta position to the nitro group the group

wherein $x$ means a substituted or unsubstituted alkyl-, aryl-, aralkyl-, alkoxy- or hydroaryl radical or a substituted or unsubstituted amino group.

The new accelerators may be prepared, for example, by reacting upon accelerators containing one of the groupings:—

or a salt thereof with a nitro halogen aryl compound containing a nitro group and a halogen atom in ortho- or para-position to one another and the grouping

in meta-position to the nitro group.

Suitable sulfhydryl compounds are, for example mercapto arylene thiazoles, such as 2-mercaptobenzo-thiazole, 2-mercapto-1'.2'-naphthothiazole which compounds may be substituted by monovalent substitutents, such as halogen atoms, (chlorine or bromine, for example), nitro groups, amino-, alkyl-, aryl- or alkoxy groups (methyl-, ethyl, butyl, phenylamino-, dimethylamino-, methoxy-, ethoxy groups etc.). Further suitable sulfhydryl compounds are dithiocarbamates derived from secondary amines such as dimethylamine, diethylamine, methylethylamine, dibenzylamine, ethylcyclohexylamine, dicyclohexylamine, N-methylaniline, piperidine, morpholine, thiomorpholine, hexahydrocarbazole, etc.

Suitable nitrohalogenaryl compounds with the grouping

are, for example, 2-chloro -nitrophenyl-1-sulfonic acid benzylester, 2-chloro-5-nitrophenyl-1-methylsulfone, 3 - nitro-4-chlorodiphenylsulfone-(1), 1-chloro-2-nitrophenyl-4-sulfamide, 1-bromo-2-nitrophenyl - 4 - sulfamide, 1-chloro-2-nitrophenyl-4-sulfo-methylamide, 3-nitro-4-chlorobenzene-1-sulfanilide, etc.

For the manufacture of the new accelerators a salt of the sulfhydryl compound may be caused to react with the nitro halogenaryl compound in an aqueous medium or in the presence of a suitable organic solvent such as alcohol, acetone etc., while gently heating the reaction mixture. For example, when boiling a mixture of molecular proportions of the sodium salt of 2-mercaptobenzothiazole and of 1-chloro-2-nitrobenzene-4-sulfomethylamide in acetone solution a reaction product is obtained according to the following probable equation:—

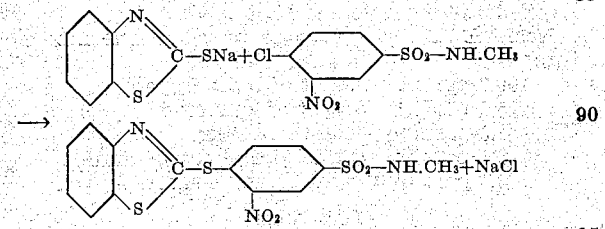

According to the same method the potassium salt of dimethyldithiocarbamic acid and 1-chloro-2-nitrobenzene-4-sulfomethylamide react with one another according to the following equation:—

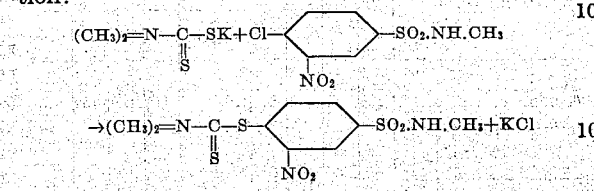

The new accelerators are generally yellowish crystalline compounds soluble in the usual organic solvents. As outlined above, they possess a good critical temperature. Furthermore, they possess a strong accelerating action and have the advantage of not decolorizing the vulcanization products to any noteworthy degree.

For vulcanization purposes the new accelerators may be incorporated within the rubber to be vulcanized in any desired manner, for example, by rolling or kneading or other mechanical means. A vulcanizing agent, such as sulfur, compounds being capable to split off sulfur, selenium, aromatic nitro compounds+metal oxides etc. are likewise incorporated within the vulcanization mixture, and, if desired, filling materials (lamp black, zinc oxide, magnesium oxide, talcum, for example) pigments, softeners, antiperishing agents etc. The mixtures thus obtainable are then vulcanized in the usual manner, for example, by heating the same to a temperature between about 120–200° C. Hard and soft rubber vulcanization products of great technical value can thus be obtained. In some cases it will be of advantage to add to the vulcanization mixture besides the new accelerators, accelerators of other types, such as diphenylguanidine, dibutylamine, ortho-tolylbiguanide, tetramethylthiuramdisulfide etc.

The following examples illustrate the invention, without limiting it thereto:—

Example 1

Accelerators tested:—

I. The reaction product of 1-chloro-2-nitrobenzene-4-sulfomonomethylamide with the sodium salt of dimethyldithiocarbamic acid II. The reaction product of 1-chloro-2-nitrobenzene-4-sulfomonomethylamide with the sodium salt of pentamethylene-dithiocarbamic acid.

III. The reaction product of 1-chloro-2-nitrobenzene-4-sulfomonomethylamide with 2-mercaptobenzothiazole in admixture with diphenylguanidine.

IV. Accelerator I in admixture with diphenylguanidine.

V. Accelerator II in admixture with diphenylguanidine.

Nos. I and II were tested in the mixture:—
- 100.0 parts by weight of light crepe
- 5.0 parts by weight of zinc oxide
- 3.0 parts by weight of sulfur
- 1.0 part by weight of accelerator Nos. III., IV. and V. were tested in the mixture:—
- 100.0 parts by weight of light crepe
- 5.0 parts by weight of zinc oxide
- 2.5 parts by weight of sulfur
- 0.6 part by weight of diphenylguanidine
- 0.4 part by weight of accelerator.

Test table $a$ = tensile strength in kg/cm$^2$
$b$ = stretch in %.

| Heating 110° C. | I | | II | | III | | IV | | V | |
|---|---|---|---|---|---|---|---|---|---|---|
| | a | b | a | b | a | b | a | b | a | b |
| 30 min | | | | | 87 | 1080 | 9 | 970 | 15 | 1025 |
| 60 min | | | 3 | 880 | 168 | 925 | 112 | 1000 | 102 | 915 |
| 126.7° C. | | | | | | | | | | |
| 30 min | 165 | 920 | 192 | 780 | 210 | 830 | 195 | 875 | 189 | 850 |
| 45 min | 195 | 860 | 205 | 755 | 217 | 808 | 208 | 815 | 231 | 826 |
| 60 min | 167 | 800 | 217 | 790 | 219 | 798 | 225 | 795 | 226 | 775 |

Example 2

Accelerators tested:—

I. The reaction product of 3-nitro-4-chloro-1.1'-diphenylsulfone with the sodium salt of dimethyldithiocarbamic acid II. The reaction product of 1-chloro-2-nitrobenzene-4-sulfanilide with the sodium salt of dimethyldithiocarbamic acid III. Accelerator I in admixture with sym. diphenylguanidine IV. Accelertor II in admixture with sym. diphenylguanidine V. The reaction product of 3-nitro-4-chloro-1.1'-diphenylsulfone with mercaptobenzothiazole in admixture with sym. diphenylguanidine VI. The reaction product of 1-chloro-2-nitrobenzene-4-sulfanilide with 2-mercaptobenzothiazole in admixture with sym. diphenylguanidine.

Nos. I and II were tested in the mixture:—
- 100.0 parts by weight of light crepe
- 5.0 parts by weight of zinc oxide
- 3.0 parts by weight of sulfur
- 1.0 part by weight of stearic acid
- 1.0 part by weight of accelerator.

Nos. III, IV, V and VI were tested in the mixture:—
- 100.0 parts by weight of light crepe
- 5.0 parts by weight of zinc oxide
- 2.5 parts by weight of sulfur
- 0.6 part by weight of diphenylguanidine
- 0.4 part by weight of accelerator.

Test table $a$ = Tensile strength in kg/cm$^2$
$b$ = Stretch in %.

| Heating 110° C. | I | | II | | III | |
|---|---|---|---|---|---|---|
| | a | b | a | b | a | b |
| 30 min | | | | | 6 | 840 |
| 60 min | | | 32 | 1087 | 93 | 1078 |
| 126.7° C. | | | | | | |
| 30 min | 144 | 964 | 228 | 863 | 139 | 824 |
| 45 min | 234 | 894 | 226 | 840 | 174 | 775 |
| 60 min | 198 | 787 | 222 | 813 | 213 | 780 |

| Heating 110° C. | IV | | V | | VI | |
|---|---|---|---|---|---|---|
| | a | b | a | b | a | b |
| 30 min | 11 | 1025 | 22 | 1008 | 3 | 680 |
| 60 min | 138 | 958 | 126 | 987 | 39 | 1190 |
| 126.7° C. | | | | | | |
| 30 min | 150 | 838 | 162 | 809 | 131 | 857 |
| 45 min | 177 | 812 | 215 | 808 | 142 | 780 |
| 60 min | 207 | 822 | 225 | 823 | 197 | 802 |

In these examples the natural rubber applied may be replaced with a good result by artificial rubber-like masses, as are obtainable, for example, by polymerizing butadiene, isoprene, 2.3-dimethylbutadiene or other forming hydrocarbons either alone or in admixture with one another or with other suitable polymerizable compounds, such as styrene, vinylnaphthalene, acrylic acid derivatives, unsaturated ketones etc.

Therefore, when using in the claims the term

"rubber" the same is intended to include natural rubber and artificial rubber-like masses as mentioned above.

We claim:—

1. Vulcanization accelerators consisting of compounds containing one of the tautomeric groupings:—

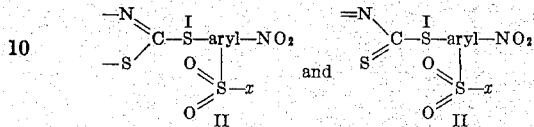

wherein the $NO_2$ group stands in orthro- or para-position to the sulfur atom marked I and in meta-position to the sulfur atom marked II, and wherein $x$ means an alkyl-, aryl-, aralkyl-, alkoxy-, hydroaryl- or amino group.

2. Vulcanization accelerators consisting of compounds of the probable formula:—

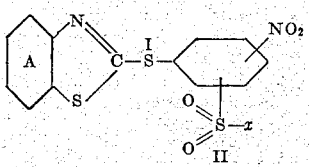

wherein the $NO_2$ group stands in ortho- or para-position to the sulfur atom marked I and in meta-position to the sulfur atom marked II, wherein $x$ means an alkyl-, aryl-, aralkyl-, alkoxy-, hydroaryl- or amino group, and wherein the nucleus marked A may be substituted by monovalent substituents.

3. Vulcanization accelerators consisting of compounds of the probable formula:—

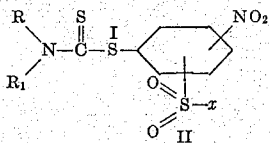

wherein the group

is the radical of a secondary amine, the $NO_2$ group stands in ortho- or para-position to the sulfur atom marked I and in meta-position to the sulfur atom marked II, and wherein $x$ means an alkyl-, aryl-, aralkyl-, alkoxy-, hydroaryl- or amino group.

4. Vulcanization accelerator having the probable formula: —

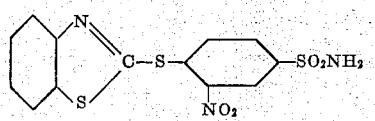

5. Vulcanization accelerator having the probable formula:—

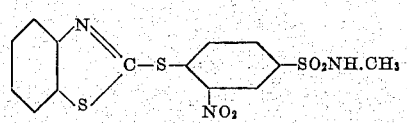

6. The process which comprises incorporating within rubber a vulcanizing agent and a vulcanization accelerator containing one of the tautomeric groupings:—

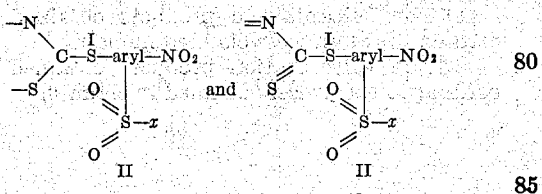

wherein the $NO_2$ group stands in ortho- or para-position to the sulfur atom marked I and in meta-position to the sulfur atom marked II, and wherein $x$ means an alkyl-, aryl-, aralkyl-, alkoxy-, hydroaryl- or amino group, and vulcanizing the mixture.

7. The process which comprises incorporating within rubber sulfur and a vulcanization accelerator of the probable formula:—

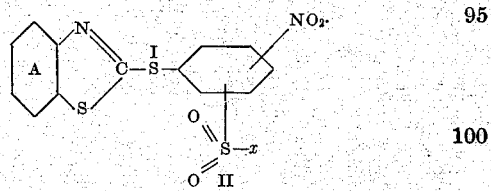

wherein the $NO_2$ group stands in ortho- or para-position to the sulfur atom marked I and in meta-position to the sulfur atom marked II, wherein $x$ means an alky-, aryl, aralkyl-, alkoxy-, hydroaryl- or amino group and wherein the nucleus marked A may be substituted by monovalent substituents, and vulcanizing the mixture.

8. The process which comprises incorporating within rubber sulfur and a vulcanization accelerator of the probable formula:—

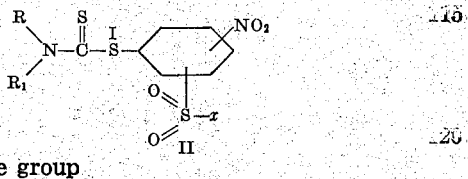

wherein the group

is the radical of a secondary amine, the $NO_2$ group stands in ortho- or para-position to the sulfur atom marked I and in meta-position to the sulfur atom marked II, and wherein $x$ means an alkyl-, aryl-, aralkyl-, alkoxy-, hydroaryl- or amino group, and vulcanizing the mixture.

9. The process which comprises incorporating within rubber sulfur and the compound of the probable formula:—

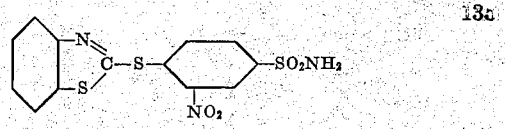

and vulcanizing the mixture.

10. The process which comprises incorporating within rubber sulfur and the compound of the probable formula:—

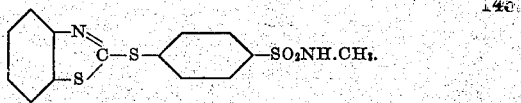

and vulcanizing the mixture.

11. The vulcanization products obtained according to the process claimed in claim 6.

12. The vulcanization products obtained according to the process claimed in claim 7.

13. The vulcanization products obtained according to the process claimed in claim 8.

14. The vulcanization products obtained according to the process claimed in claim 9.

15. The vulcanization products obtained according to the process claimed in claim 10.

LUDWIG ORTHNER.
MAX BÖGEMANN.